Dec. 17, 1940.  A. A. COOK  2,225,035

PROJECTION APPARATUS

Filed Dec. 31, 1938

ALAN A. COOK
INVENTOR.

BY

ATTORNEYS

Patented Dec. 17, 1940

2,225,035

UNITED STATES PATENT OFFICE 2,225,035

PROJECTION APPARATUS

Alan A. Cook, Rochester, N. Y., assignor to Bausch & Lomb Optical Company, Rochester, N. Y., a corporation of New York Application December 31, 1938, Serial No. 248,836

2 Claims. (Cl. 88—24)

The present invention relates to projection apparatus and more particularly to projection apparatus employing high intensity arcs and wide angle reflectors.

In the presentation of motion pictures, the trend is toward larger theaters with longer projection distances. The increased projection distances require more light and this requirement has been met by using larger, more intense and hotter arcs as a source of illumination. Apart from the large current consumption of these arcs and the resulting electrical problems, the terrific heat generated presents difficult questions of insulation, cooling and ventilation.

The intensity of the projection beam could also be increased without increasing the size of the arc, by using a wide angle reflector to concentrate the light from the arc. This solution, however, has heretofore been considered impossible due to the practice of constructing theaters with the projection booth at the rear of the theater high above the projection screen. In the ordinary theater, the projector must be inclined downwardly at a considerable angle to direct the images onto the screen and the reflectors were necessarily kept small so that they would not extend over the arc when the projector was so inclined.

One of the objects of the present invention is to provide a high intensity light projector for projecting images downward to a screen. Another object is to provide a projector for directing images downward to a screen, with a high intensity arc and a wide angle reflector. A further object is to provide a projector having a horizontal lamp house and means for directing light downward to a screen. These and other objects and advantages reside in certain novel features of construction, arrangement and combination of parts as will hereinafter be more fully set forth and pointed out in the appended claims.

Referring to the drawing.

Figure 1:
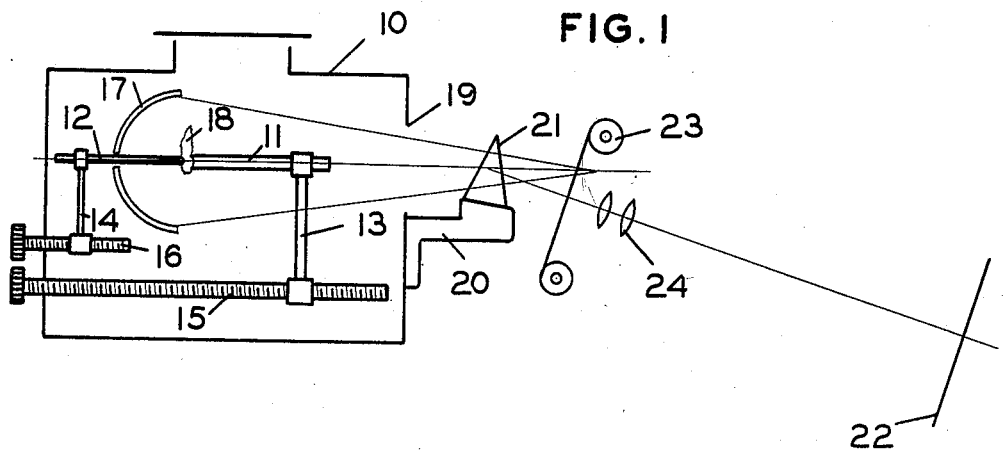
Fig. 1 is a diagrammatic view of a projector embodying my invention.

The present invention is illustrated diagrammatically in Fig. 1 wherein 10 designates a lamphouse within which the positive and negative carbons 11 and 12, respectively, forming a high intensity arc, are mounted on supports 13 and 14, respectively, under the control of adjusting screws or mechanisms 15 and 16, respectively. A wide angle reflector 17 encircles the negative carbon 12 and concentrates the light from the arc. This reflector 17 may have an angular opening as great as 140 to 150 degrees or more. It is, however, essential that no part of the reflector 17 extend close to or over the flame 18 of the arc. This flame 18 is so hot that it will melt or distort the reflector 17 if brought sufficiently close. When such a wide angle reflector 17 is used, the lamphouse 10 must remain horizontal since any tilting of the lamphouse would move the reflector to a location over the flame 18 of the arc.

The front wall of the housing 10 has an aperture 19 and carries a shelf 20 below the aperture 19. A suitable light deflector such as the prism 21 is positioned on this shelf to deflect the light downward to the screen 22. This prism 21 is preferably made of heat resisting and absorbing glass and is preferably located near the focus of the reflector 17. The placing of the prism 21 near the smallest part of the beam permits the use of a smaller prism.

A suitable transparency support such as the film 23 is placed in the deviated light beam and an objective 24 serves to image a transparency on the screen 22. Of course, any desired form of transparency or transparency support could be used in place of the film 23.

Figure 2:
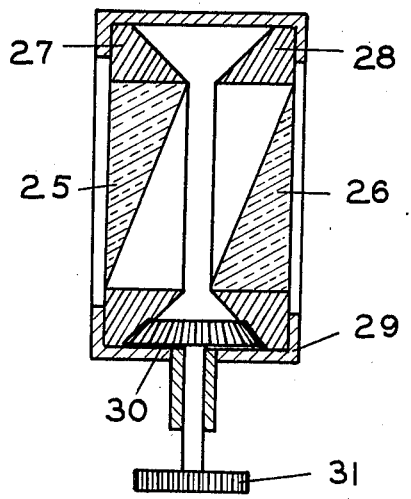
Fig. 2 is a section of an adjustable light deviating system.

It may be desirable or necessary to provide a projector with a variable angle light deflector instead of the prism 21 and Fig. 2 illustrates one very simple variable light deflector. As shown in Fig. 2, two equal prisms 25 and 26 are secured in rings 27 and 28, respectively. Rings 27 and 28 are provided with suitable gear teeth on their periphery and are rotatably mounted within the housing 29. These rings 27 and 28 are driven in opposite directions by a bevel gear 30 which engages the teeth on the rings and which is rotated by a knob 31. For a vertical deviation of the beam, the prisms 25 and 26 are positioned so as to neutralize each other in a horizontal plane and upon rotation of the knob 31, a vertical prism component will be introduced. This prism component varies in both directions from zero to the combined strength of both prisms.

From the foregoing, it will be apparent that I am able to attain the objects of my invention and provide a projector with a horizontal arc and wide angle reflector for projecting images downward onto a screen. Various modifications can, of course, be made without departing from the spirit of my invention or the scope of the appended claims.

I claim:

1. A projection apparatus for projecting images downward at an angle onto a screen situated below the apparatus, said apparatus comprising a horizontal lamphouse, a horizontal high intensity arc within said lamphouse, a wide angle reflector positioned behind said arc for focusing the light from the arc, said lamphouse having an opening located substantially on the optical axis of the reflector adjacent the focus thereof, a prism positioned in front of said opening for deflecting the light downward to said screen, means for supporting a transparency in the deflected beam and means for forming an image of said transparency on said screen.

2. A high intensity projection apparatus for directing light to a projection screen situated above or below said apparatus, comprising a horizontal lamphouse, a horizontal, high intensity arc positioned within said lamphouse, a wide angle reflector positioned behind said arc, adjustable light deviating means carried by said lamphouse adjacent the focus of said arc, means for adjusting said deviating means to direct the light from said arc onto said screen, a transparency support for holding a transparency in the light beam between said deviating means and said screen and an objective for forming an image of said transparency on said screen.

ALAN A. COOK.